United States Patent
Park et al.

(10) Patent No.: US 9,305,704 B2
(45) Date of Patent: Apr. 5, 2016

(54) MULTILAYER CERAMIC CAPACITOR AND MANUFACTURING METHOD THEREOF

(71) Applicant: SAMSUNG ELECTRO-MECHANICS CO., LTD., Suwon, Gyunggi-do (KR)

(72) Inventors: Heung Kil Park, Gyunggi-do (KR); Min Cheol Park, Gyunggi-do (KR)

(73) Assignee: SAMSUNG ELECTRO-MECHANICS CO., LTD., Suwon, Gyunggi-Do (KR)

(*) Notice: Subject to any disclaimer, the term of this patent is extended or adjusted under 35 U.S.C. 154(b) by 198 days.

(21) Appl. No.: 14/067,580

(22) Filed: Oct. 30, 2013

(65) Prior Publication Data

US 2015/0016014 A1    Jan. 15, 2015

(30) Foreign Application Priority Data

Jul. 11, 2013   (KR) .................. 10-2013-0081745

(51) Int. Cl.
*H01G 4/30* (2006.01)
*H01G 2/06* (2006.01)
*H01G 4/012* (2006.01)

(52) U.S. Cl.
CPC .............. *H01G 2/065* (2013.01); *H01G 4/012* (2013.01); *H01G 4/30* (2013.01)

(58) Field of Classification Search
CPC .................................. H01G 4/30; H01G 4/012
USPC ............... 361/301.4, 306.1, 306.3, 311–313, 361/321.1, 321.22
See application file for complete search history.

(56) References Cited

U.S. PATENT DOCUMENTS

| | | | |
|---|---|---|---|
| 4,661,884 A * | 4/1987 | Seaman | 361/306.2 |
| 6,807,047 B2 | 10/2004 | Togashi et al. | |
| 7,706,123 B2 | 4/2010 | Togashi et al. | |
| 8,319,594 B2 * | 11/2012 | Sato et al. | 336/200 |
| 2010/0002356 A1 | 1/2010 | Yoshida et al. | |
| 2012/0236462 A1 | 9/2012 | Haruki et al. | |

FOREIGN PATENT DOCUMENTS

| | | |
|---|---|---|
| JP | 46-19234 Y | 7/1971 |
| JP | 64-18722 U | 1/1989 |
| JP | 5-77943 U | 10/1993 |

(Continued)

OTHER PUBLICATIONS

Korean Office Action issued in corresponding Korean Application No. 10-2013-0081745, dated Jul. 4, 2014, with English translation.

(Continued)

*Primary Examiner* — Nguyen T Ha
(74) *Attorney, Agent, or Firm* — McDermott Will & Emery LLP

(57) ABSTRACT

There is provided a multilayer ceramic capacitor including, a ceramic body having a plurality dielectric layers stacked therein and a groove portion recessed inwardly in a lower surface thereof in a width direction, a plurality of first and second internal electrodes disposed in the ceramic body to be alternately exposed through both end surfaces of the ceramic body, having the dielectric layers therebetween, and first and second external electrodes respectively formed on both end portions of the ceramic body and electrically connected to the first and second internal electrodes, respectively.

21 Claims, 11 Drawing Sheets

(56) References Cited

FOREIGN PATENT DOCUMENTS

| | | |
|---|---|---|
| JP | 9-186042 A | 7/1997 |
| JP | 2000-223357 A | 8/2000 |
| JP | 2002-329635 A | 11/2002 |
| JP | 2004-288847 A | 10/2004 |
| JP | 2010-16071 A | 1/2010 |
| JP | 2012-253245 A | 12/2012 |
| JP | 2013-093374 A | 5/2013 |
| JP | 2013-102232 A | 5/2013 |
| KR | 2012-0106599 A | 9/2012 |

OTHER PUBLICATIONS

Notice of Office Action Japanese Patent Application No. 2013-210764 dated Jun. 9, 2015 with full English translation.

* cited by examiner

A-A'

B-B'

MULTILAYER CERAMIC CAPACITOR AND MANUFACTURING METHOD THEREOF

CROSS-REFERENCE TO RELATED APPLICATIONS

This application claims the benefit of Korean Patent Application No. 10-2013-0081745 filed on Jul. 11, 2013, with the Korean Intellectual Property Office, the disclosure of which is incorporated herein by reference.

BACKGROUND OF THE INVENTION

1. Field of the Invention

The present invention relates to a multilayer ceramic capacitor and a manufacturing method thereof.

2. Description of the Related Art

A multilayer ceramic capacitor (MLCC), a multilayer chip electronic component, is capable of being used in various electronic devices, due to advantages such as a small size, high capacitance, ease of mounting, or the like.

For example, the multilayer ceramic capacitor is used in a chip-shaped condenser mounted on printed circuit boards of various electronic products including display devices, liquid crystal displays (LCDs), plasma display panels (PDPs) and the like, for example, as well as including computers, smartphones, mobile phones, and the like, to serve to charge and discharge electricity therein.

The multilayer ceramic capacitor may have a structure in which a plurality of dielectric layers and internal electrodes having different polarities are alternately stacked while being interposed between the dielectric layers.

In this case, since the dielectric layers have piezoelectric properties, when a direct current (DC) voltage or an alternating current (AC) voltage is applied to the multilayer ceramic capacitor, a piezoelectric phenomenon may be generated between the internal electrodes, such that a volume of a ceramic body is expanded and contracted according to a frequency, thereby generating periodic vibrations.

The vibrations are transmitted to a printed circuit board through external electrodes and a solder connecting the external electrodes of the multilayer ceramic capacitor to the printed circuit board, such that the entire printed circuit board becomes a sound reflective surface to generate a vibration sound to be a noise.

The vibration sound may be in an audible frequency region of 20 to 20,000 Hz, causing listener discomfort, and the vibration sound causing listener discomfort refers to an acoustic noise.

Recently, in electronic devices, since acoustic noise generated in the multilayer ceramic capacitor as described above may be significant due to a decreased noise of components, research into a technology of effectively decreasing the acoustic noise generated in the multilayer ceramic capacitor has been required.

As a method of decreasing the acoustic noise as described above, a method of attaching frame-shaped metal terminals to both end surfaces of the multilayer ceramic capacitor and mounting the multilayer ceramic capacitor on the printed circuit board so as to be spaced apart therefrom by a predetermined interval has been disclosed.

However, in order to decrease the acoustic noise to a predetermined level using the metal terminals, it is necessary to increase a thickness of the metal terminals to a predetermined standard or more.

In this case, since the increase in the thickness of the metal terminals as described above may increase a thickness of a component in which the multilayer ceramic capacitor is mounted, the increase in the thickness of the metal terminals may not be applied to a product having a limitation in the thickness thereof.

The following Patent Document 1 discloses a method of decreasing acoustic noise transmitted from a multilayer ceramic capacitor to a printed circuit board, using a metal terminal, but fails to disclose a method of decreasing a size (thickness) of a component having the multilayer ceramic capacitor mounted thereon.

RELATED ART DOCUMENT (Patent Document 1) Korean Patent Laid-Open Publication No. KR 2012-0106599

SUMMARY OF THE INVENTION

An aspect of the present invention provides a multilayer ceramic capacitor capable of effectively decreasing acoustic noise occurring when vibrations generated in the multilayer ceramic capacitor by a piezoelectric phenomenon are transmitted to a printed circuit board, without an increase in a thickness of a product having the multilayer ceramic capacitor mounted therein.

According to an aspect of the present invention, there is provided a multilayer ceramic capacitor including: a ceramic body having a plurality dielectric layers stacked therein and a groove portion recessed inwardly in a lower surface thereof in a width direction, a plurality of first and second internal electrodes disposed in the ceramic body to be alternately exposed through both end surfaces of the ceramic body, having the dielectric layers therebetween, and first and second external electrodes respectively formed on both end portions of the ceramic body and electrically connected to the first and second internal electrodes, respectively.

The multilayer ceramic capacitor may further include first and second dummy electrodes formed in a lower margin part of the ceramic body to face each other in a length direction, centered on the groove portion.

The first and second dummy electrodes may be respectively exposed through the both end surfaces of the ceramic body and be connected to the first and second external electrodes, respectively.

The first and second dummy electrodes may be spaced apart from the first and second external electrodes.

The multilayer ceramic capacitor may further include first and second dummy electrodes formed in a lower margin part of the ceramic body to face each other in a length direction, centered on the groove portion, the lower margin part having a thickness greater than that of an upper margin part of the ceramic body.

The first and second dummy electrodes may be respectively exposed through the both end surfaces of the ceramic body and be connected to the first and second external electrodes, respectively.

The multilayer ceramic capacitor may further include first and second dummy patterns formed in the ceramic body to face the first and second internal electrodes while being spaced apart from the first and second internal electrodes in a length direction, respectively, and connected to the second and first external electrodes, respectively.

According to another aspect of the present invention, there is provided a multilayer ceramic capacitor including: a ceramic body having a plurality dielectric layers stacked therein and a groove portion recessed inwardly in a lower surface thereof in a length direction; a plurality of first and second internal electrodes disposed in the ceramic body to be alternately exposed through both end surfaces of the ceramic body, having the dielectric layers therebetween; and first and second external electrodes respectively formed on both end portions of the ceramic body and electrically connected to the first and second internal electrodes, respectively.

The multilayer ceramic capacitor may further include first and second dummy electrodes formed in a lower margin part of the ceramic body to face each other in a width direction, centered on the groove portion.

The first and second dummy electrodes may be respectively exposed through the both end surfaces of the ceramic body and be connected to the first and second external electrodes, respectively, and may include first and second exposed parts respectively exposed through the both end surfaces of the ceramic body; and pairs of extension parts protruded from ends of the first and second exposed parts to be perpendicular thereto, inwardly in the ceramic body in the length direction thereof.

The multilayer ceramic capacitor may further include first and second dummy electrodes formed in a lower margin part of the ceramic body to face each other in a width direction, centered on the groove portion, the lower margin part having a thickness greater than that of an upper margin part of the ceramic body.

The first and second dummy electrodes may be respectively exposed through the both end surfaces of the ceramic body and connected to the first and second external electrodes, respectively. Lengths of the first and second dummy electrodes may be increased in an upward direction from a lower surface of the ceramic body. The first and second dummy electrodes may be formed in a stepped manner, in an upward direction from the lower surface of the ceramic body.

According to another aspect of the present invention, there is provided a manufacturing method of a multilayer ceramic capacitor, the manufacturing method including: preparing a stacked body having an inwardly recessed portion positioned between first and second dummy electrodes by stacking a plurality of ceramic sheets having first and second internal electrodes formed therein to face each other, having the ceramic sheets therebetween and stacking thereon, a plurality of ceramic sheets having the first and second dummy electrodes formed therein to face each other, having a predetermined interval therebetween, and pressing the plurality of ceramic sheets; preparing a ceramic body such that the first and second dummy electrodes are respectively exposed through both end surfaces thereof and the first and second internal electrodes are alternately exposed through both end surfaces thereof, by cutting the stacked body into portions, each corresponding one capacitor, and firing the portion; and forming first and second external electrodes in the ceramic body to be electrically connected to the first and second internal electrodes, respectively.

In the preparing of the stacked body, the first and second dummy electrodes may be disposed to face each other in a length direction of the ceramic body.

In the preparing of the stacked body, the first and second dummy electrodes may be disposed to face each other in a width direction of the ceramic body.

According to another aspect of the present invention, there is provided a mounting board of a multilayer ceramic capacitor, the mounting board including: a printed circuit board having first and second electrode pads disposed thereon; and at least one multilayer ceramic capacitor mounted on the printed circuit board, wherein the multilayer ceramic capacitor includes: a ceramic body having a plurality dielectric layers stacked therein and a groove portion recessed inwardly in a mounting surface thereof in a width direction; a plurality of first and second internal electrodes disposed in the ceramic body to be alternately exposed through both end surfaces of the ceramic body, having the dielectric layers therebetween; and first and second external electrodes respectively formed on both end portions of the ceramic body, electrically connected to the first and second internal electrodes, respectively, and connected to the first and second electrode pads by a solder.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
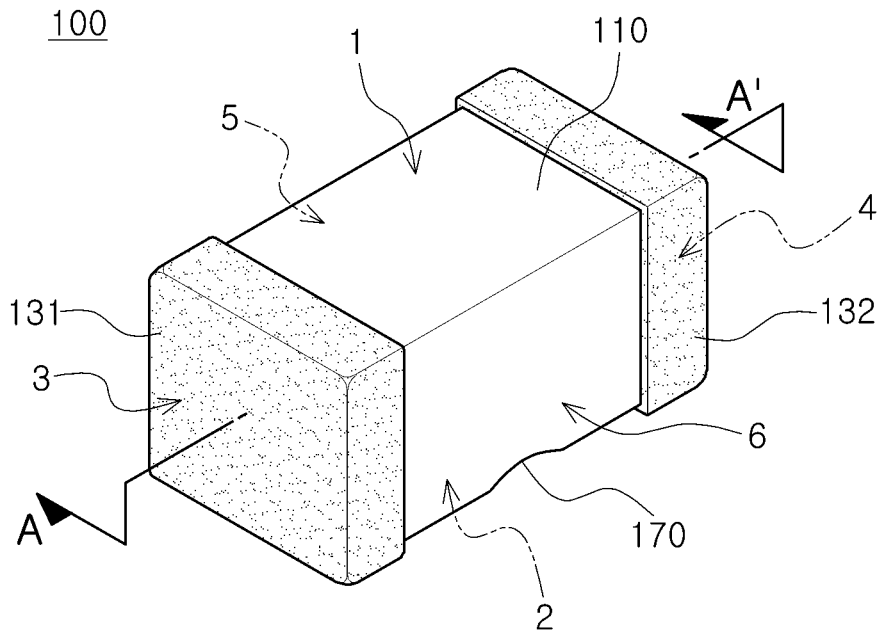
FIG. 1 is a perspective view schematically showing a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

In the drawings, the shapes and dimensions of elements may be exaggerated for clarity.

Multilayer Ceramic Capacitor

Figure 2:
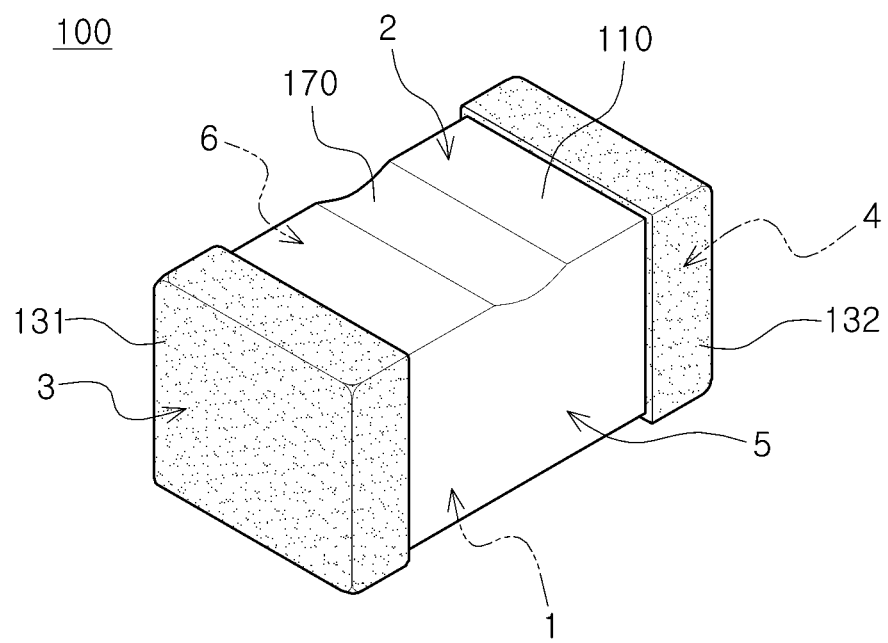
FIG. 2 is a bottom view of FIG. 1.
Figure 3A:
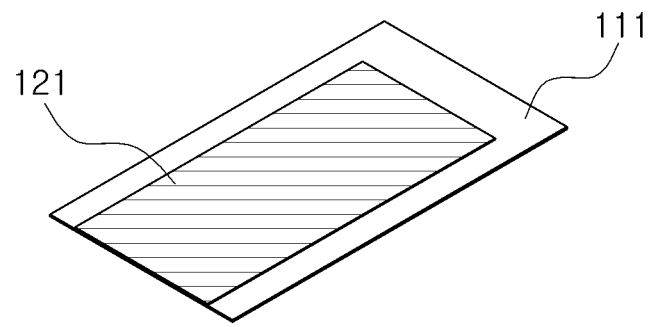
FIGS. 3A through 3C are perspective views respectively showing first and second internal electrodes and dummy electrodes applied to the multilayer ceramic capacitor of FIG. 1.
Figure 3B:
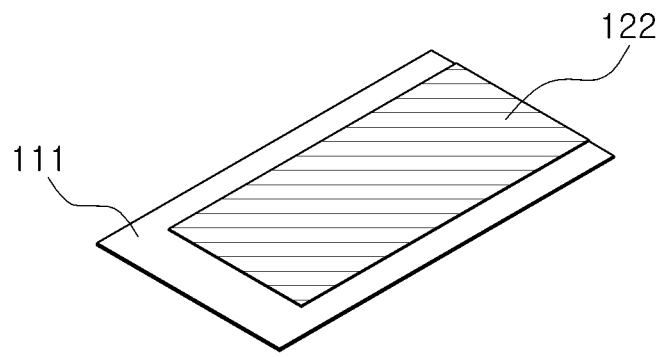
Figure 3C:
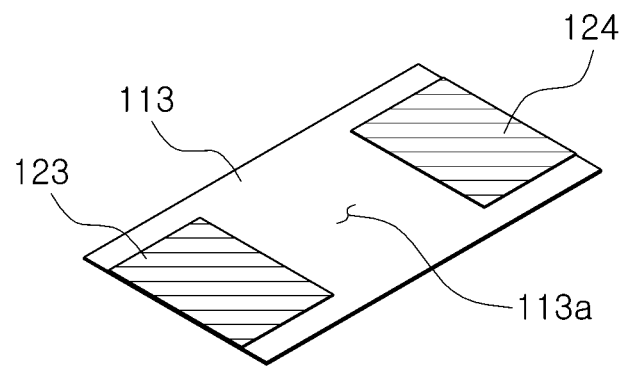
Figure 4:
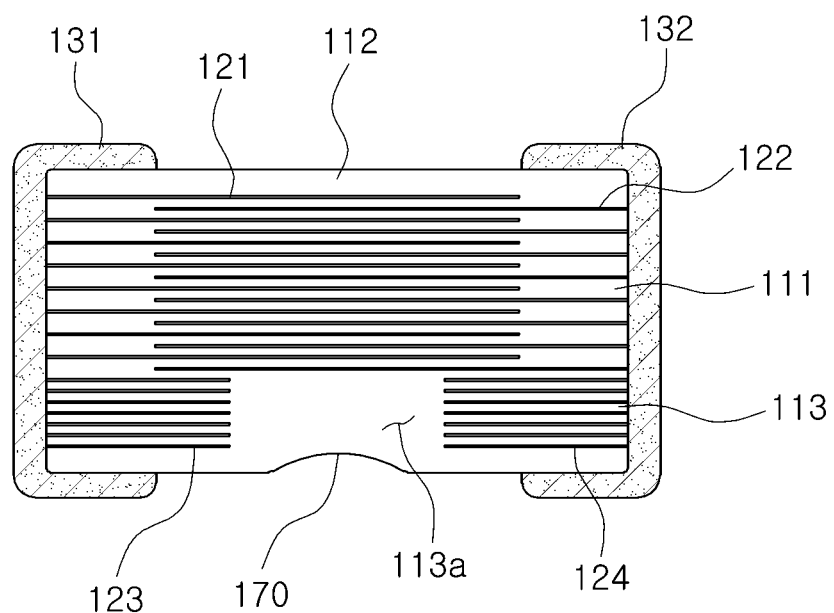
FIG. 4 is a cross-sectional view of the multilayer ceramic capacitor, taken along line A-A' of FIG. 1.

FIG. 1 is a perspective view schematically showing a multilayer ceramic capacitor according to an embodiment of the present invention, FIG. 2 is a bottom view of FIG. 1, FIGS. 3A through 3C are perspective views respectively showing first and second internal electrodes and dummy electrodes applied to the multilayer ceramic capacitor of FIG. 1, and FIG. 4 is a cross-sectional view of the multilayer ceramic capacitor, taken along line A-A' of FIG. 1.

Referring to FIGS. 1 through 4, a multilayer ceramic capacitor 100 according to the present embodiment may include a ceramic body 110 including a plurality of dielectric layers 111 stacked therein, a plurality of first and second internal electrodes 121 and 122, and first and second external electrodes 131 and 132 electrically connected to the first and second internal electrodes 121 and 122, respectively.

The ceramic body 110 may be formed by stacking the plurality of dielectric layers 111 in a thickness direction thereof and performing firing thereon, wherein boundaries between adjacent dielectric layers 111 may be integrated such that they may not be readily discernible.

In addition, the ceramic body 110 may have a hexahedral shape. In the present embodiment, surfaces of the ceramic body 110 facing each other in the thickness direction, that is, in a direction in which the dielectric layers 111 of the ceramic body 110 are stacked, are defined as first and second main surfaces 1 and 2, surfaces connecting the first and second main surfaces 1 and 2 and facing each other in a length direction may be defined as third and fourth end surfaces 3 and 4, and surfaces facing each other in a width direction may be defined as fifth and sixth side surfaces 5 and 6.

In the present embodiment, the second main surface 2 of the ceramic body 110, a mounting surface of the multilayer ceramic capacitor 100 may be provided with a groove portion 170 recessed inwardly in a width direction.

The dielectric layer 111 may include a ceramic material having a high dielectric constant, and for example, a barium titanate ($BaTiO_3$)-based ceramic powder, or the like, but the present invention is not limited thereto as long as sufficient capacitance is obtained thereby.

Furthermore, the dielectric layers 111 may include a ceramic powder and if necessary, further include various types of ceramic additives such as a transition metal oxide or transition metal carbide, rare earth elements, and magnesium (Mg) or aluminum (Al), an organic solvent, a plasticizer, a binder and a dispersant, along with the ceramic powder.

The first and second internal electrodes 121 and 122, which are electrodes having different polarities, may be stacked on at least one surface of a ceramic sheet forming the dielectric layer 111, and may be disposed in the ceramic body 100 so as to be alternately exposed through the third and fourth end surfaces 3 and 4, having the dielectric layer 111 therebetween.

In this case, the first and second internal electrodes 121 and 122 may be electrically insulated from each other by the dielectric layers 111 disposed therebetween.

Capacitance of the multilayer ceramic capacitor 100 may be proportional to an area of the first and second internal electrodes 121 and 122 overlapped with each other in the stacking direction of the dielectric layers 111.

That is, the first and second internal electrodes 121 and 122 may be continuously stacked in the thickness direction to configure an active region for forming the capacitance in the ceramic body 110.

In addition, in a cross-section of the multilayer ceramic capacitor 100 in a length-thickness direction, portions except for the active region may be defined as margin parts.

Among the margin parts, margin parts positioned on an upper portion and a lower portion of the active region in the thickness direction may be formed by stacking a plurality of upper and lower cover layers 112 and 113 having no internal electrodes formed therein.

The upper and lower cover layers 112 and 113 may be formed by sintering ceramic sheets in a similar manner to that of the dielectric layer 111 having the first and second internal electrodes 121 and 122 formed therein.

The upper and lower margin parts are formed such that the plurality of upper and lower cover layers 112 and 113 are sintered and may be integrated so as not to confirm boundaries between the upper and lower cover layers 112 and 113 adjacent to each other.

In the present embodiment, the lower margin part has a thickness greater than that of the upper margin part.

That is, the lower margin part may have the thickness greater than that of the upper margin part by increasing the number of the ceramic sheets stacked in the lower cover layer as compared to the upper margin part, and in this manner, in the case in which the active region is spaced apart from the mounting surface, vibrations generated in the multilayer ceramic capacitor 100 and transmitted to a board at the time of mounting the multilayer ceramic capacitor 100 on the board may be decreased.

However, the present invention is not limited thereto, but may be changed in various manners in which the upper margin part has a thickness greater than that of the lower margin part or the upper margin part and the lower margin part have the same thickness in a range satisfying a standard range of a product.

In addition, the first and second internal electrodes 121 and 122 may be formed of a conductive metal, for example, one of silver (Ag), palladium (Pd), platinum (Pt), nickel (Ni), and copper (Cu), alloys thereof, or the like, but the present invention is not limited thereto.

The first and second external electrodes 131 and 132 may be extended from the third and fourth end surfaces 3 and 4 of the ceramic body 110 to the surfaces 1, 2, 5, and 6 adjacent thereto so as to be electrically connected to the first and second internal electrodes 121 and 122 by covering the plurality of first and second internal electrodes 121 and 122 exposed through the third and fourth end surfaces 3 and 4, respectively.

In addition, the first and second external electrodes 131 and 132 may be formed of a conductive metal, for example, one of silver (Ag), palladium (Pd), platinum (Pt), nickel (Ni), and copper (Cu), alloys thereof, or the like, but the present invention is not limited thereto.

In this case, the first and second external electrodes 131 and 132 may have first and second plating layers (not shown) formed thereon, as needed.

The first and second plating layers may include a nickel (Ni) plating layer formed on the first and second external electrodes 131 and 132 and a tin (Sn) plating layer formed on the nickel plating layer.

The first and second plating layers are provided to increase adhesion strength between the multilayer ceramic capacitor 100 and a printed circuit board at the time of mounting the multilayer ceramic capacitor 100 on the printed circuit board, or the like, by solder, or the like. The plating may be performed by a method known in the art.

Meanwhile, the lower cover layer 113 forming the lower margin part of the ceramic body 110 may have a plurality of first and second dummy electrodes 123 and 124 formed therein to face each other with a predetermined gap 113a therebetween in the length direction centered on the groove portion 170. The gap 113a is a component required for forming the groove portion 170 in a compression process, and a detailed description thereof will be described in a manufacturing method as described below.

In this case, the first and second dummy electrodes 123 and 124 may be exposed through the third and fourth end surfaces 3 and 4 of the ceramic body 110 to be connected to the first and second external electrodes 131 and 132, respectively.

Figure 14:
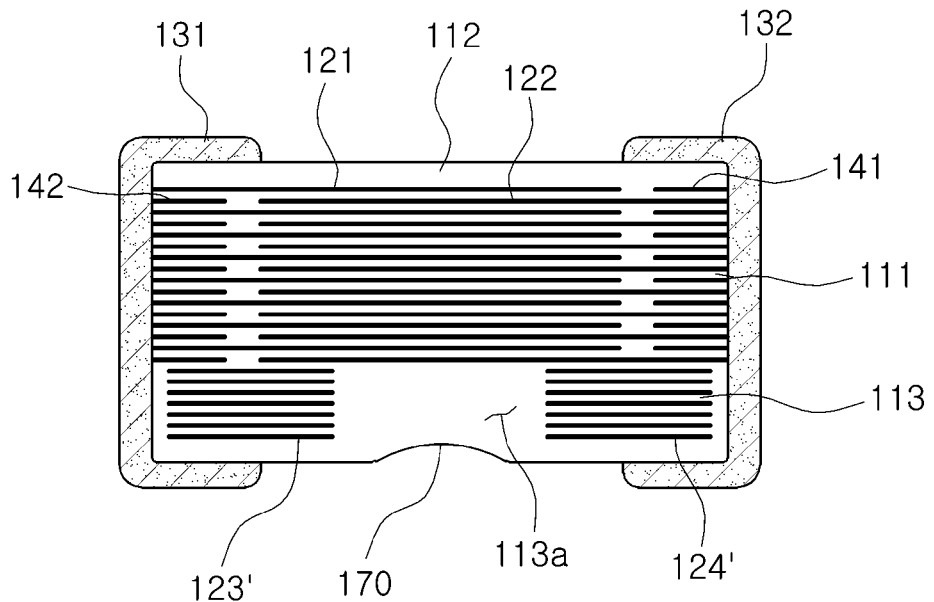

In addition, as another example, referring to FIG. 14, first and second dummy electrodes 123' and 124' may not be exposed through the third and fourth end surfaces 3 and 4 of the ceramic body 110 and may be included in the ceramic body 110 to be spaced apart from the first and second external electrodes 131 and 132, respectively.

Figure 13:
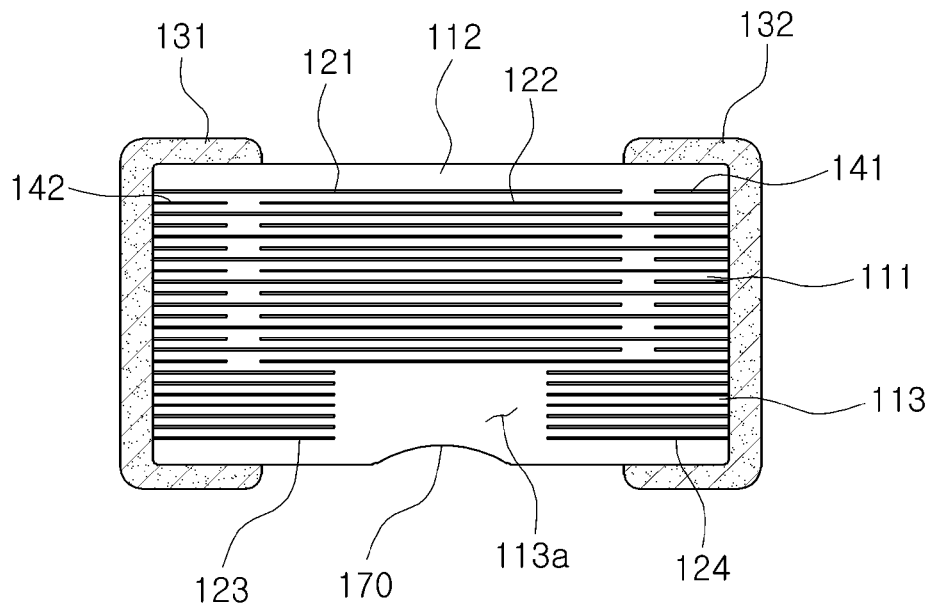
FIGS. 13 through 16 are side cross-sectional views respectively showing another example of the multilayer ceramic capacitor according to the present invention.

Referring to FIGS. 13 and 14, the ceramic body 110 may further include first and second dummy patterns 141 and 142 formed therein to face the first and second internal electrodes 121 and 122 in the length direction while being spaced apart from the first and second internal electrodes 121 and 122, respectively.

In this case, the first and second dummy patterns 141 and 142 may be exposed through the both end surfaces of the ceramic body 110, respectively, such that end portions of the first and second dummy patterns are connected to the second external electrode 132 and the first external electrode 131, respectively.

Manufacturing Method of Multilayer Ceramic Capacitor

Hereinafter, a manufacturing method of the multilayer ceramic capacitor according to the embodiment of the present invention will be described.

First, a plurality of ceramic sheets are prepared. The ceramic sheets are provided to form the dielectric layers 111 of the ceramic body 110 and the upper and lower cover layers 112 and 113 of upper and lower margin parts of the ceramic body 110 and may be manufactured by mixing a ceramic powder, a polymer, a solvent, and the like to prepare a slurry, and then applying and drying the slurry onto carrier films to form the slurry in sheet shapes each having a thickness of several μm by a doctor blade method or the like.

Next, the first and second internal electrodes 121 and 122 are formed by printing a conductive paste at a predetermined thickness on at least one surface of the plurality of respective ceramic sheets.

Here, the first and second internal electrodes 121 and 122 are exposed through the both end surfaces of the ceramic sheets in the length direction, respectively.

Methods of printing the conductive paste may include a screen printing method, a gravure printing method, and the like, but the present invention is not limited thereto.

Further, the conductive paste is printed at a predetermined thickness on at least one surface of a portion of the ceramic sheets, such that the first and second dummy electrodes 123 and 124 may be formed to face each other, having a predetermined interval therebetween.

In this case, the first and second dummy electrodes 123 and 124 may be disposed to face each other in the length direction of the ceramic sheet.

The first and second dummy electrodes 123 and 124 may be disposed in the lower margin part, and do not have a structure in which the internal electrodes having different polarities are overlapped with each other, having the ceramic sheets therebetween.

Therefore, the first and second dummy electrodes 123 and 124 may not contribute to the formation of capacitance except for a parasitic capacitance generated by influences of the first and second external electrodes 131 and 132 on the third and fourth end surfaces 3 and 4 of the ceramic body 110 or the active region for forming capacitance.

Then, the plurality of ceramic sheets having the first and second dummy electrodes 123 and 124 formed therein are stacked, the plurality of ceramic sheets having the first and second internal electrodes 121 and 122 formed therein are stacked thereon in such a manner that the first and second internal electrodes 121 and 122 face each other, having the ceramic sheets therebetween, and then, the plurality of ceramic sheets having no electrodes formed therein are stacked thereon.

In this case, the plurality of ceramic sheets may be stacked in an asymmetric manner in which the lower margin part configured of the plurality of ceramic sheets having the first and second dummy electrodes 123 and 124 formed therein has a thickness greater than that of the upper margin part configured of the plurality of ceramic sheets having no electrodes formed therein.

In general, in a case in which the ceramic body 110 has the upper margin part and the lower margin part formed in an asymmetric manner, since the active region having the first and second internal electrodes 121 and 122 and the lower margin part disposed therebelow have a difference in shrinkage rates when they are sintered and shrunk in a firing process, delamination or crack defects may be increased.

However, in the present embodiment, since the first and second dummy electrodes 123 and 124 are formed in the lower margin part, the difference in shrinkage rates between the active region and the lower margin part is decreased, such that the delamination or crack defects may be decreased or even though the delamination is generated, the delamination is generated in the dummy electrode rather than the internal electrode, thereby increasing reliability of a product.

Figure 5A:
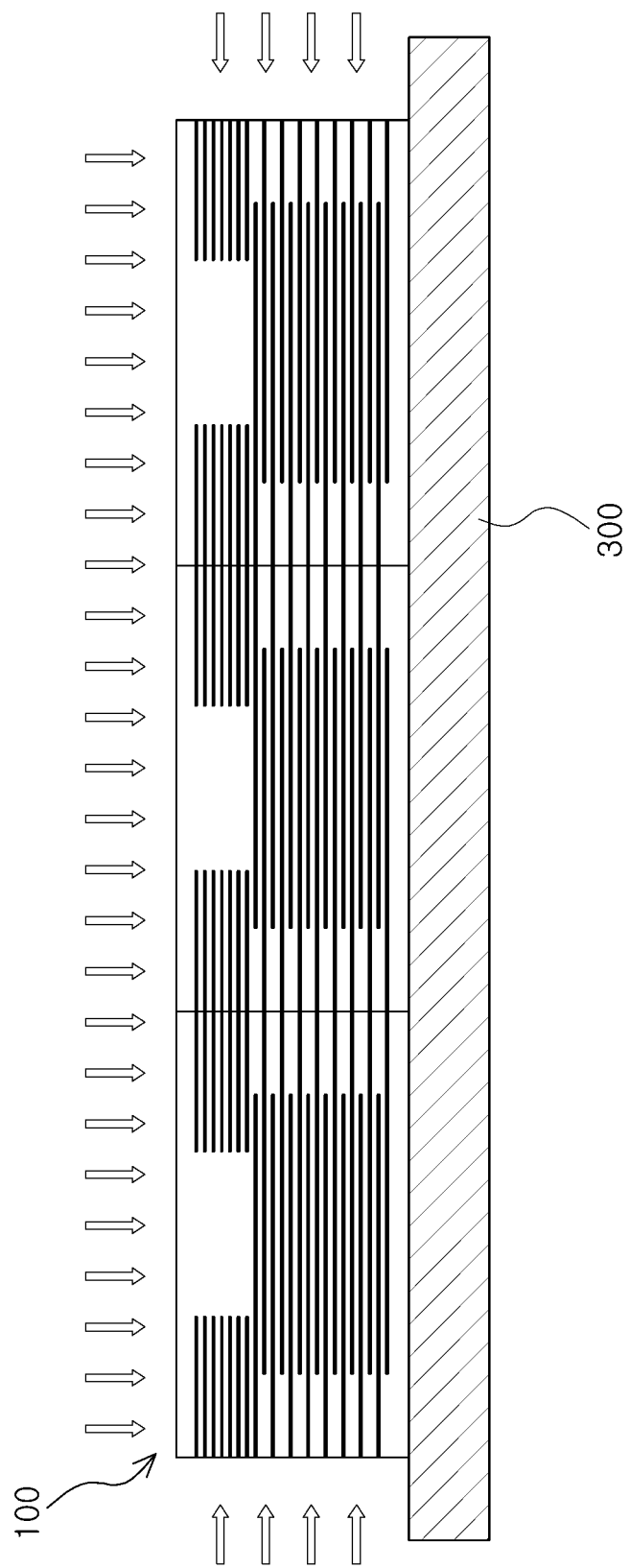
FIGS. 5A and 5B are side cross-sectional views showing a method of forming a groove portion in a mounting surface of a ceramic body in a manufacturing method of the multilayer ceramic capacitor according to the embodiment of the present invention.

Then, as shown in FIG. 5A, the ceramic sheets stacked as described above are disposed on a flat metal plate 300 in such a manner that the ceramic sheets having the first and second dummy electrodes 123 and 124 formed therein are arranged in an upper portion thereof, and then the disposed ceramic sheets are pressed in downward and inward directions to thereby prepare a stacked body.

Figure 5B:
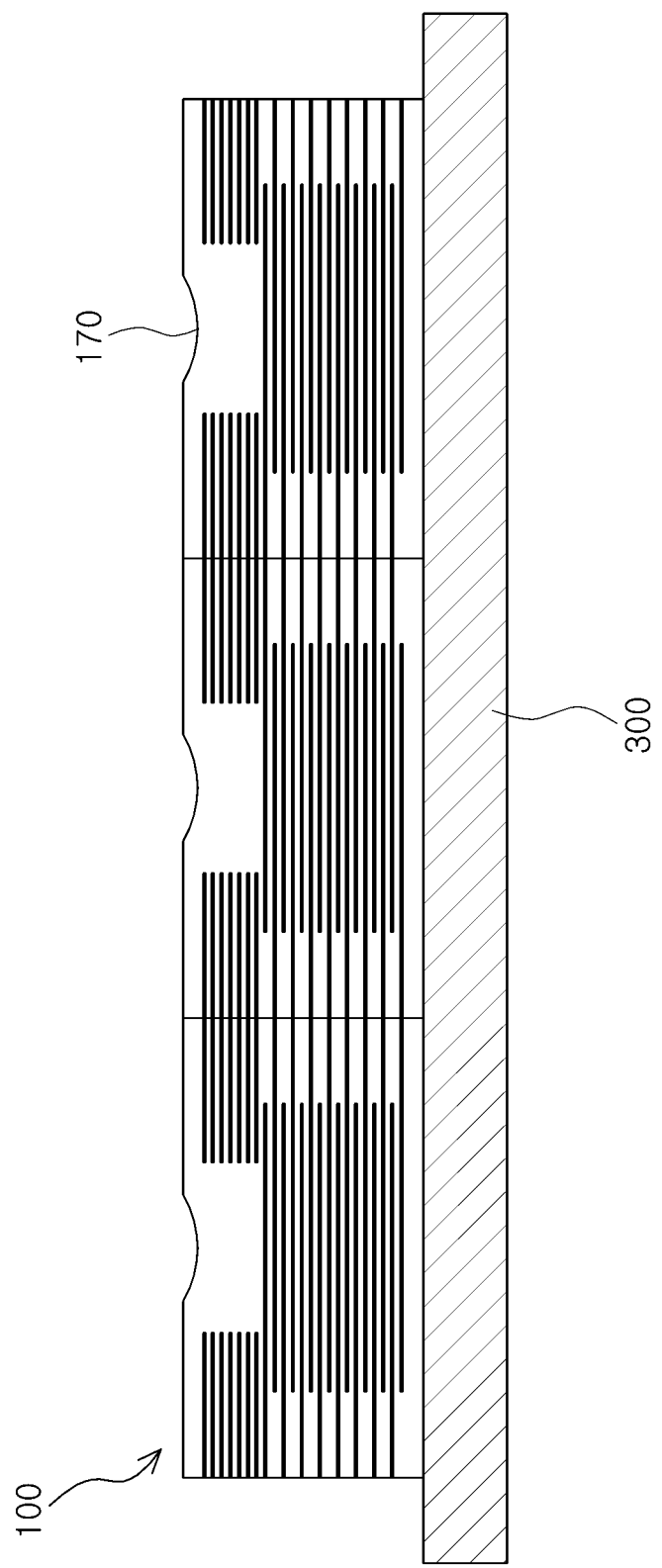

In this case, as shown in FIG. 5B, one surface of the stacked body, that is, a portion of the second main surface 2, positioned between the first and second dummy electrodes 123 and 124 is recessed inwardly due to force supported by the first and second dummy electrodes 123 and 124, such that the groove portion 170 may be formed therein.

Therefore, the groove portion 170 may be formed in a direction perpendicular to directions in which the first and second dummy electrodes 123 and 124 face each other.

That is, in the case in which the first and second dummy electrodes 123 and 124 face each other in the length direction, the groove portion may be extended in the width direction, and in the case in which the first and second dummy electrodes 123 and 124 face each other in the width direction, the groove portion may be extended in the length direction.

Then, the stacked body is cut into portions, each corresponding to one capacitor chip, and then the portions are fired at a high temperature to prepare the ceramic bodies 110 each having first and second main surfaces 1 and 2 facing each other in the thickness direction, third and fourth end surfaces 3 and 4 facing each other in the length direction and having the first and second internal electrodes 121 and 122 alternately exposed thereto, and fifth and sixth side surfaces 5 and 6 facing each other in the width direction.

Next, the first and second external electrodes 131 and 132 are formed on the end surfaces of the ceramic body 110 in a thickness-length direction so as to be electrically connected to exposed portions of the first and second internal electrodes 121 and 122.

Here, after forming the first and second external electrodes 131 and 132, a plating process such as an electroplating process may be performed on surfaces of the first and second external electrodes 131 and 132, such that first and second plating layers (not shown) may be formed, as needed.

Examples of materials used in the plating process may include nickel or tin, a nickel-tin-alloy, and the like, but the present invention is not limited thereto.

In addition, the first and second plating layers may have a two-layer structure by sequentially stacking a nickel plating layer and a tin plating layer on the surfaces of the first and second external electrodes 131 and 132, as needed.

Figure 6:
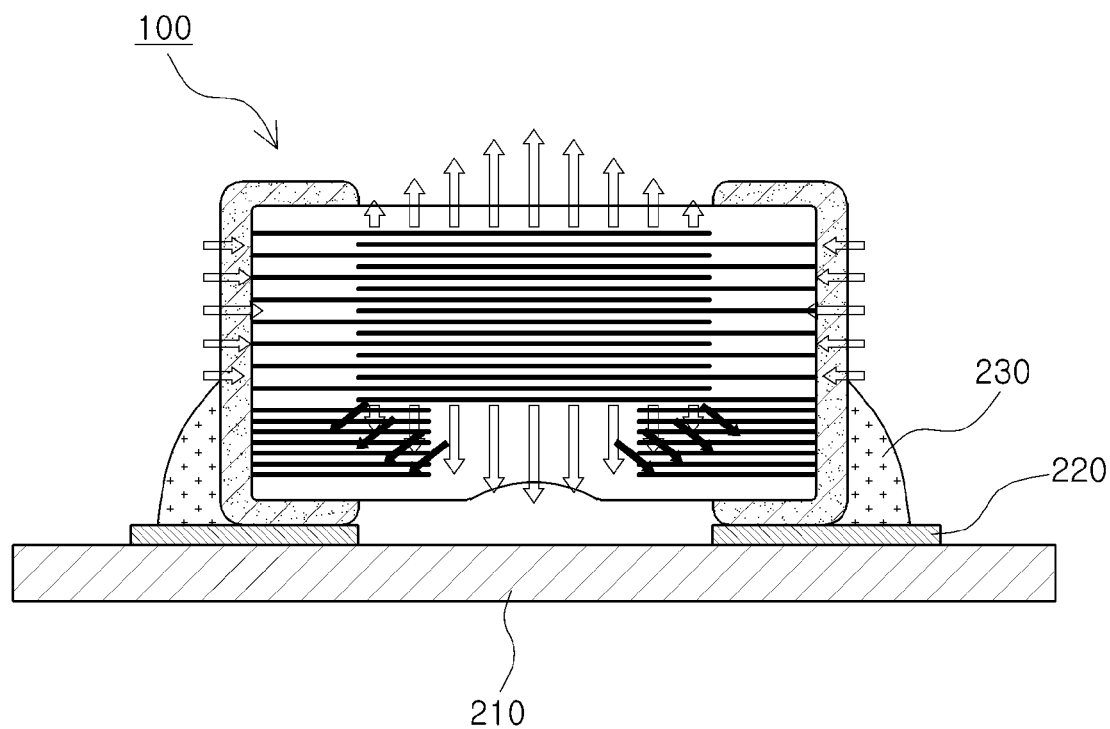
FIG. 6 is a side cross-sectional view schematically showing a state in which the multilayer ceramic capacitor according to the embodiment of the present invention is applied to a mounting board.

FIG. 6 is a side cross-sectional view schematically showing a state in which the multilayer ceramic capacitor according to the embodiment of the present invention is applied to a mounting board.

Referring to FIG. 6, the mounting board to which the multilayer ceramic capacitor 100 is applied may include a printed circuit board 210 having the multilayer ceramic capacitor 100 mounted thereon, and first and second electrode pads 220 formed on the printed circuit board 210 to be spaced apart from each other.

In this case, the multilayer ceramic capacitor 100 may be mounted on the printed circuit board 210 such that the second main surface 2 of the ceramic body 110 having the groove portion 170 formed therein faces the printed circuit board 210, and the first and second external electrodes 131 and 132 may be electrically connected to the printed circuit board 210 by a solder 230 while being positioned on the first and second electrode pads 220 to contact therewith, respectively.

In the case in which voltages having different polarities are applied to the first and second external electrodes 131 and 132 of the multilayer ceramic capacitor 100 in a state in which the multilayer ceramic capacitor 100 is mounted on the printed circuit board 210 as described above, the ceramic body 110 may be repeatedly expanded and shrunk in the thickness direction due to an inverse piezoelectric effect of the dielectric layers 111 to generate the vibrations (see white arrows of FIG. 6).

In this case, since piezoelectric stress generated in the ceramic body 110 due to the groove portion 170 recessed inwardly in the second main surface 2 of the ceramic body 110 is dispersed and suppressed, as shown in 'black arrows' of FIG. 6 and only a small amount of piezoelectric stress is transmitted to the printed circuit board 210 through the solder 230, acoustic noise may be decreased.

MODIFIED EXAMPLE

Figure 7:
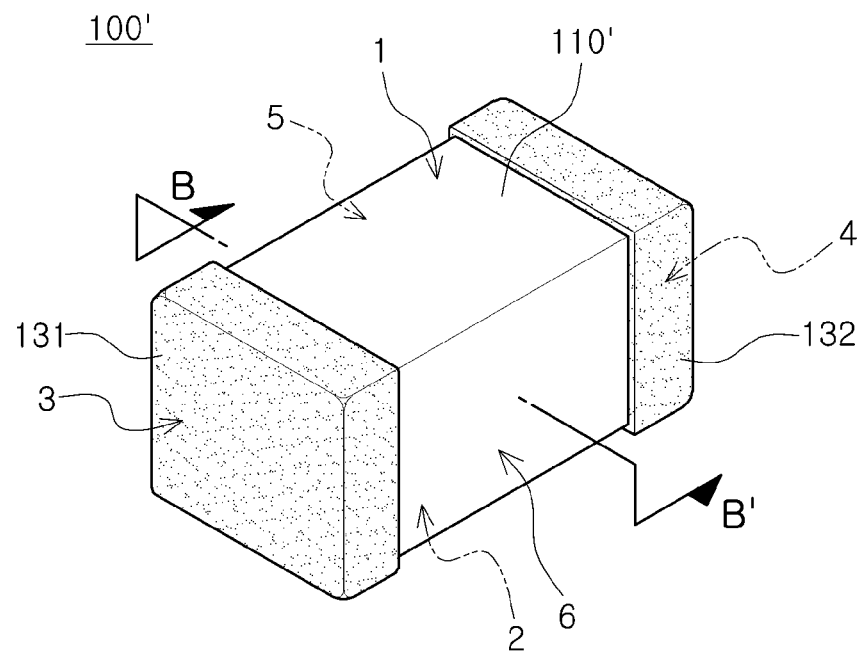
FIG. 7 is a perspective view schematically showing a multilayer ceramic capacitor according to another embodiment of the present invention.
Figure 8:
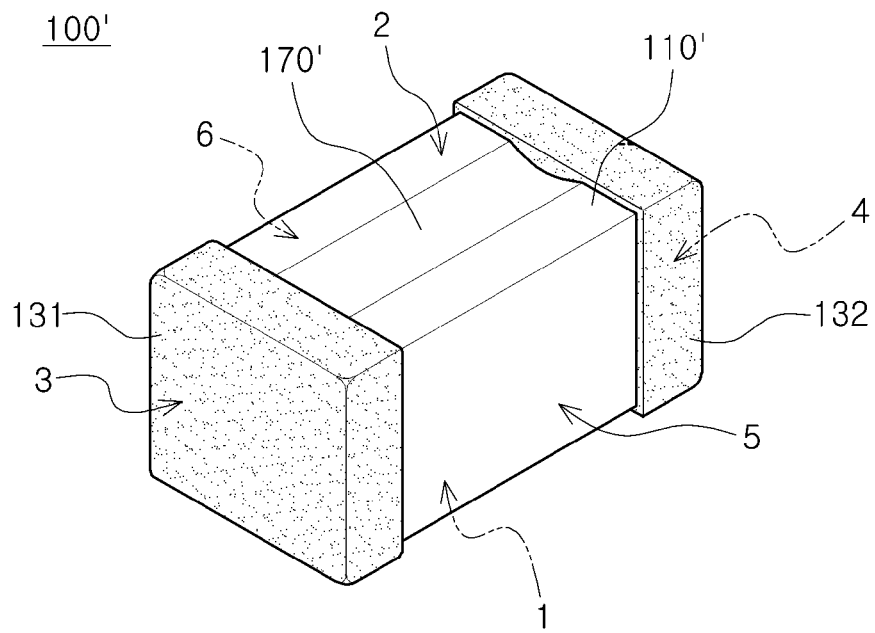
FIG. 8 is a bottom view of FIG. 7.
Figure 9:
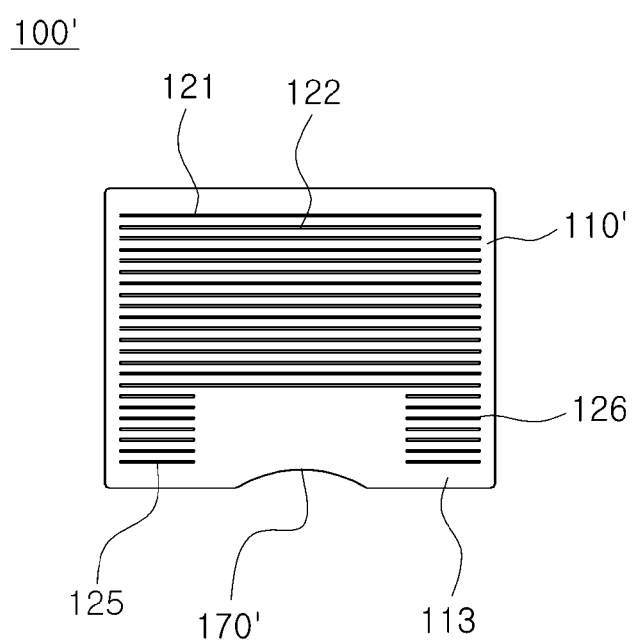
FIG. 9 is a cross-sectional view of the multilayer ceramic capacitor, taken along line B-B' of FIG. 7.
Figure 10A:
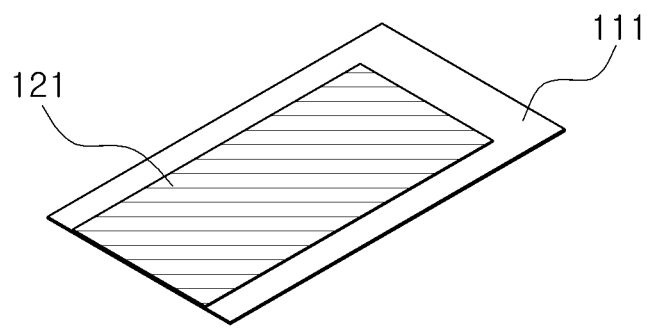
FIGS. 10A through 10C are perspective views respectively showing first and second internal electrodes and dummy electrodes applied to the multilayer ceramic capacitor of FIG. 7.
Figure 10B:
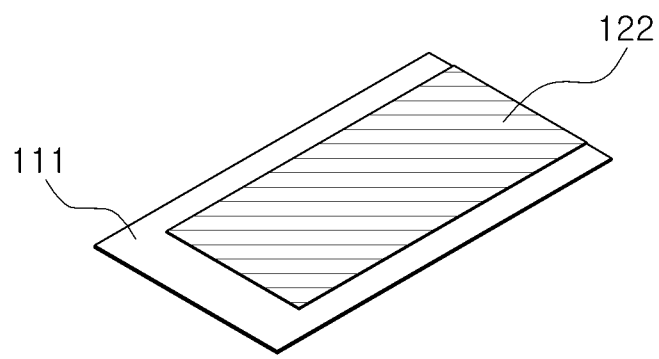
Figure 10C:
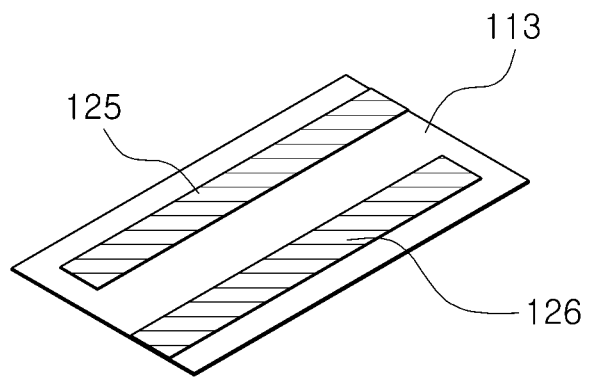

FIG. 7 is a perspective view schematically showing a multilayer ceramic capacitor according to another embodiment of the present invention. FIG. 8 is a bottom view of FIG. 7. FIG. 9 is a cross-sectional view of the multilayer ceramic capacitor, taken along line B-B' of FIG. 7. FIGS. 10A through 10C are perspective views respectively showing first and second internal electrodes and dummy electrodes applied to the multilayer ceramic capacitor of FIG. 7.

In this case, since a structure in which the first and second internal electrodes 121 and 122 and the first and second external electrodes 131 and 132 are formed is similar to the structure as described in the foregoing embodiment of the present invention, a detailed description thereof will be omitted in order to avoid a repeated explanation, and only a groove portion 170' and first and second dummy electrodes having different structures from those as described in the foregoing embodiment of the present invention will be described in detail.

Referring to FIGS. 7 through 10, in a multilayer ceramic capacitor 100' according to the present embodiment, the groove portion 170' of the ceramic body 110' may be formed in the length direction of the ceramic body 110'. In the case in which the groove portion 170' is formed in the length direction, an area of the groove portion 170' is larger than that of the case in which the groove portion is formed in the width direction, such that stress may be further effectively dispersed.

Therefore, first and second dummy electrodes 125 and 126 may be formed in the lower cover layer 113 to face each other in the width direction, having a predetermined interval therebetween.

Figure 11:
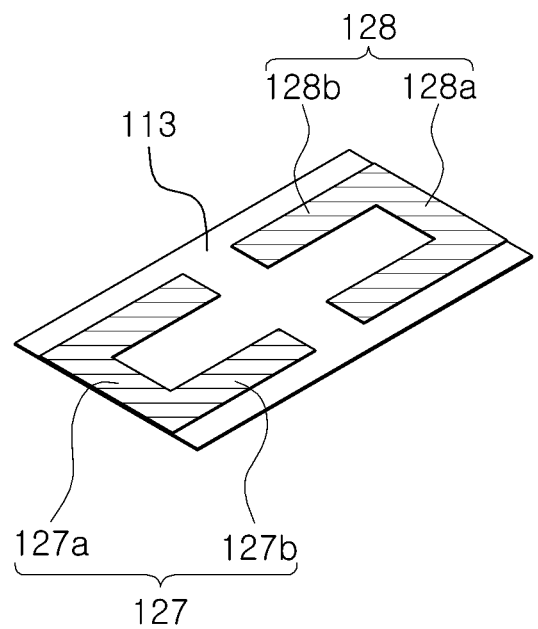
FIG. 11 is a perspective view showing another example of the dummy electrode applied to the multilayer ceramic capacitor of FIG. 7.
Figure 12:
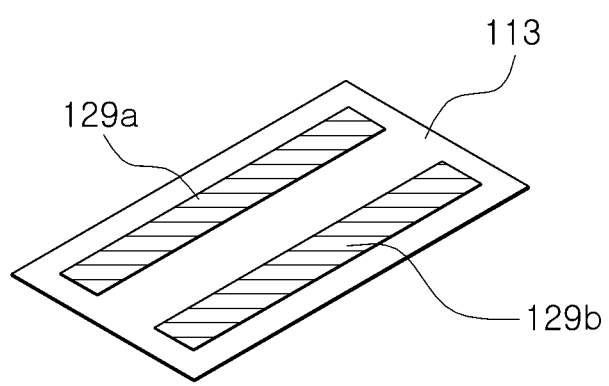
FIG. 12 is a perspective view showing another example of the dummy electrode applied to the multilayer ceramic capacitor of FIG. 7.

FIGS. 11 and 12 are perspective views respectively showing another example of the dummy electrode applied to the multilayer ceramic capacitor 100' according to the present embodiment.

For example, referring to FIG. 11, first and second dummy electrodes 127 and 128 may include first and second exposed parts 127a and 128a exposed through the third and fourth end surfaces 3 and 4 of the ceramic body 110, respectively; and pairs of extension parts 127b and 128b protruded from ends of the first and second exposed parts 127a and 128a to be perpendicular thereto, inwardly in the ceramic body 110 in the length direction thereof. In the structure as described above, the groove portion is formed in both of the length direction and the width direction, such that the stress is simultaneously dispersed in the length direction and the width direction and is further effectively dispersed.

In addition, referring to FIG. 12, first and second dummy electrodes 129a and 129b may be configured of floating electrodes not in contact with the first and second external electrodes 131 and 132 but facing each other in the lower cover layer 113. In this case, since the first and second dummy electrodes 129a and 129b are not electrically connected to the first and second external electrodes 131 and 132, stray capacitance between the printed circuit board and the external electrodes is decreased, such that high frequency properties may be improved.

Figure 15:
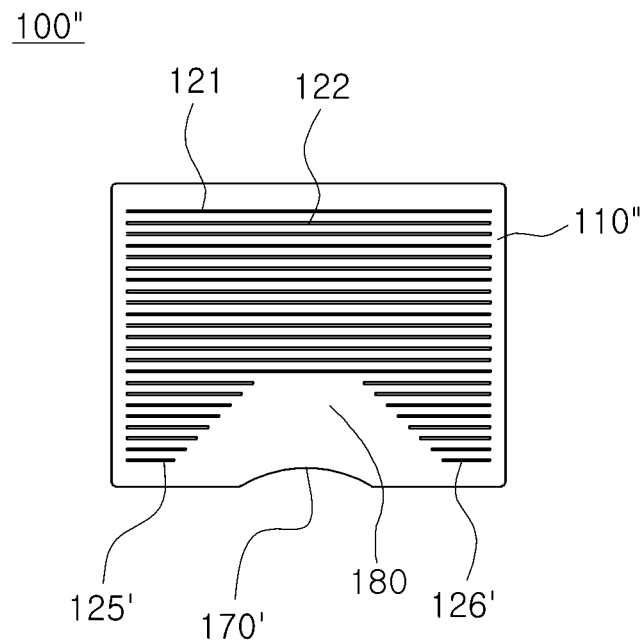

Meanwhile, referring to FIG. 15, in a multilayer ceramic capacitor 100" of the present embodiment, a plurality of first and second dummy electrodes 125' and 126' may have different lengths in the thickness direction and the lengths thereof are increased in an upward direction from a lower surface of the ceramic body 110" in which the groove portion 170' is formed, such that a margin part 180 formed between the first and second dummy electrodes 125' and 126' may have a tapered shape in which the margin part is narrowed in the upward direction.

Figure 16:
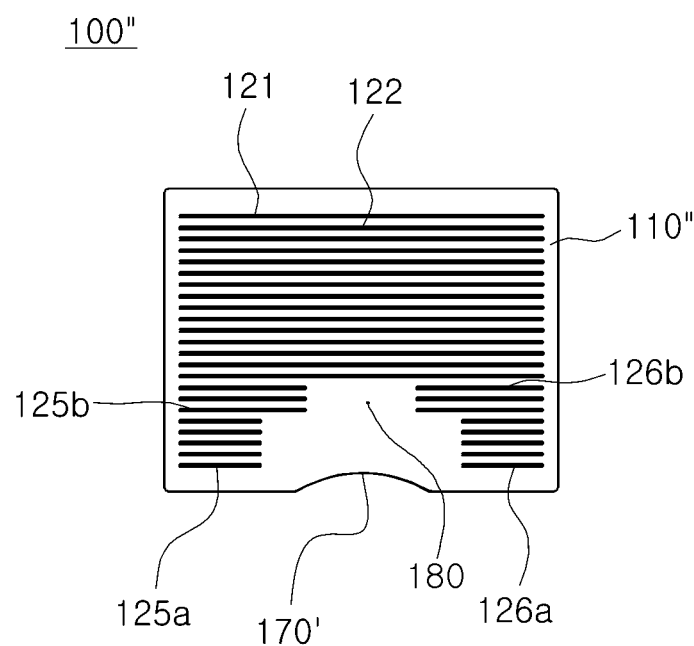

In addition, referring to FIG. 16, in the multilayer ceramic capacitor 100" of the present embodiment, the plurality of first and second dummy electrodes 125a, 125b, 126a, and 126b may have different lengths in the thickness direction and the lengths thereof may be varied such that the dummy electrodes are formed in a stepped manner, in the upward direction from the lower surface of the ceramic body 110' in which the groove portion 170' is formed, whereby the margin part 180 may have a stepped shape in which the margin part is narrowed in an upward direction.

As set forth above, according to the embodiments of the present invention, a groove portion is formed in a mounting surface of a multilayer ceramic capacitor to be recessed inwardly therein, whereby piezoelectric stress generated in the multilayer ceramic capacitor at the time of mounting the multilayer ceramic capacitor on a printed circuit board can be dispersed and suppressed without an increase in a thickness (height) of a product having the multilayer ceramic capacitor mounted therein. Thus, vibrations transferred to the printed circuit board through a solder are decreased to reduce acoustic noise.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor, comprising:
    a ceramic body having a plurality of dielectric layers stacked therein in a thickness direction and a groove portion recessed in a lower surface thereof toward the thickness direction, wherein the groove portion extends in a width direction;
    a plurality of first and second internal electrodes disposed in the thickness direction in the ceramic body to be alternately exposed through both end surfaces of the ceramic body, having the dielectric layers therebetween; and
    first and second external electrodes respectively formed on both end portions of the ceramic body and electrically connected to the first and second internal electrodes, respectively.

2. The multilayer ceramic capacitor of claim 1, further comprising first and second dummy electrodes formed in a lower margin part of the ceramic body to face each other in a length direction, centered on the groove portion.

3. The multilayer ceramic capacitor of claim 2, wherein the first and second dummy electrodes are respectively exposed through the both end surfaces of the ceramic body and connected to the first and second external electrodes, respectively.

4. The multilayer ceramic capacitor of claim 2, wherein the first and second dummy electrodes are spaced apart from the first and second external electrodes.

5. The multilayer ceramic capacitor of claim 1, further comprising first and second dummy electrodes formed in a lower margin part of the ceramic body to face each other in a length direction, centered on the groove portion, the lower margin part having a thickness greater than that of an upper margin part of the ceramic body.

6. The multilayer ceramic capacitor of claim 5, wherein the first and second dummy electrodes are respectively exposed through the both end surfaces of the ceramic body and connected to the first and second external electrodes, respectively.

7. The multilayer ceramic capacitor of claim 5, wherein the first and second dummy electrodes are spaced apart from the first and second external electrodes.

8. The multilayer ceramic capacitor of claim 1, further comprising first and second dummy patterns formed in the ceramic body to face the first and second internal electrodes while being spaced apart from the first and second internal electrodes in a length direction, respectively, and connected to the second and first external electrodes, respectively.

9. A multilayer ceramic capacitor comprising:
    a ceramic body having a plurality of dielectric layers stacked therein in a thickness direction and a groove portion recessed in a lower surface thereof toward the thickness direction, wherein the groove portion extends in a length direction;
    a plurality of first and second internal electrodes disposed in the thickness direction in the ceramic body to be alternately exposed through both end surfaces of the ceramic body, having the dielectric layers therebetween; and
    first and second external electrodes respectively formed on both end portions of the ceramic body and electrically connected to the first and second internal electrodes, respectively.

10. The multilayer ceramic capacitor of claim of claim 9, further comprising first and second dummy electrodes formed in a lower margin part of the ceramic body to face each other in a width direction, centered on the groove portion.

11. The multilayer ceramic capacitor of claim 10, the first and second dummy electrodes are respectively exposed through the both end surfaces of the ceramic body and connected to the first and second external electrodes, respectively.

12. The multilayer ceramic capacitor of claim 11, wherein lengths of the first and second dummy electrodes are increased in an upward direction from a lower surface of the ceramic body.

13. The multilayer ceramic capacitor of claim 11, wherein the first and second dummy electrodes are formed in a stepped manner, in an upward direction from the lower surface of the ceramic body.

14. The multilayer ceramic capacitor of claim 10, wherein the first and second dummy electrodes are spaced apart from the first and second external electrodes.

15. The multilayer ceramic capacitor of claim 10, wherein the first and second dummy electrodes include first and second exposed parts respectively exposed through the both end surfaces of the ceramic body; and pairs of extension parts protruded from ends of the first and second exposed parts to be perpendicular thereto, inwardly in the ceramic body in the length direction thereof.

16. The multilayer ceramic capacitor of claim 9, further comprising first and second dummy electrodes formed in a lower margin part of the ceramic body to face each other in a width direction, centered on the groove portion, the lower margin part having a thickness greater than that of an upper margin part of the ceramic body.

17. The multilayer ceramic capacitor of claim 16, wherein the first and second dummy electrodes are respectively exposed through the both end surfaces of the ceramic body and connected to the first and second external electrodes, respectively.

18. The multilayer ceramic capacitor of claim 16, wherein the first and second dummy electrodes are spaced apart from the first and second external electrodes.

19. A manufacturing method of a multilayer ceramic capacitor, the manufacturing method comprising:
    preparing a stacked body having an inwardly recessed portion positioned between first and second dummy electrodes by stacking a plurality of ceramic sheets having first and second internal electrodes formed therein to face each other, having the ceramic sheets therebetween and stacking thereon, a plurality of ceramic sheets having the first and second dummy electrodes formed therein to face each other, having a predetermined interval therebetween, and pressing the plurality of ceramic sheets;
    preparing a ceramic body such that the first and second dummy electrodes are respectively exposed through both end surfaces thereof and the first and second internal electrodes are alternately exposed through both end surfaces thereof, by cutting the stacked body into portions, each corresponding one capacitor, and firing the portion; and forming first and second external electrodes in the ceramic body to be electrically connected to the first and second internal electrodes, respectively.

20. The manufacturing method of claim 19, wherein in the preparing of the stacked body, the first and second dummy electrodes are disposed to face each other in a length direction of the ceramic body.

21. The manufacturing method of claim 19, wherein in the preparing of the stacked body, the first and second dummy electrodes are disposed to face each other in a width direction of the ceramic body.

* * * * *